June 3, 1969 J. R. LANEY, JR 3,447,252

RADIO AND/OR TELEVISION LOG HOLDER

Filed Sept. 23, 1966

INVENTOR

James R. Laney Jr.

BY

Richard D. Law

ATTORNEY

United States Patent Office 3,447,252

Patented June 3, 1969

3,447,252

RADIO AND/OR TELEVISION LOG HOLDER

James R. Laney, Jr., 319 Evergreen Trail, Ponderosa Hills, Parker, Colo. 80134

Filed Sept. 23, 1966, Ser. No. 581,647
Int. Cl. G09f *11/295*
U.S. Cl. 40—31 7 Claims

ABSTRACT OF THE DISCLOSURE

A radio and/or television log holder, having a scroll-type log, utilizes a clock motor mechanism to operate a clock and wind the scroll log on a reel in synchronization with the time schedule.

This invention relates to radio and/or television log holders and particularly to automatically changing log holders which change programs in relation to time.

Conventionally, radio and television logs are published weekly in a supplement to the Sunday newspaper, and such logs include the succeeding week's entire broadcast. Daily logs are also published, but these are not as conveniently used as the weekly logs. Additionally, the logs, in a booklet form, may be purchased separately from other sources. Such logs may receive substantial use and may become soiled and worn and, at times, torn. Not infrequently such logs are lost or misplaced, particularly when no means are provided for holding the log or where portable television sets or radios are used in different locations. Furthermore, the prime television viewing time includes the evening hours after dark, and it is usual for most people to turn down extraneous lighting to provide the better viewing of the television screen. Oftentimes the television log is misplaced in the dark and finding the desired program in the log itself in the darkened room is annoying and usually requires the viewer to remove himself from a comfortable position, turn on a light, find the log if misplaced, and then read the log prior to changing channels and then turning out the light for viewing the desired television program. Additionally, the logs may require considerable searching through the columns and/or thumbing through pages, to find the current day's time and program schedule.

Included among the objects and advantages of the present invention is a program log holder arranged for holding a television and/or radio program log in position for easy access.

Another object of the invention is to provide a television or radio program log holder arranged to automatically move the log in relation to a predetermined time schedule so as to maintain current programming easily accessible for the viewer or listener.

A still further object of the invention is to provide a combined television log or radio program log holder with an easily set clock for coordinating current television and radio programs in the log with the current time.

These and other objects and advantages of the invention may be readily ascertained by referring to the following description and appended illustrations.

Generally, the device of the invention is arranged to hold a radio or a television program log which is printed in a single column on a long strip of paper wound on a spool in the manner of a scroll. The type of spool may be a conventional spool such as used for film for cameras. The holder is arranged to show only a portion of the program on the log sheet and, in one embodiment, it is geared with a clock so that the scroll moves forward in relation to advancing time as shown by the clock.

Figures 1, 2, 3:
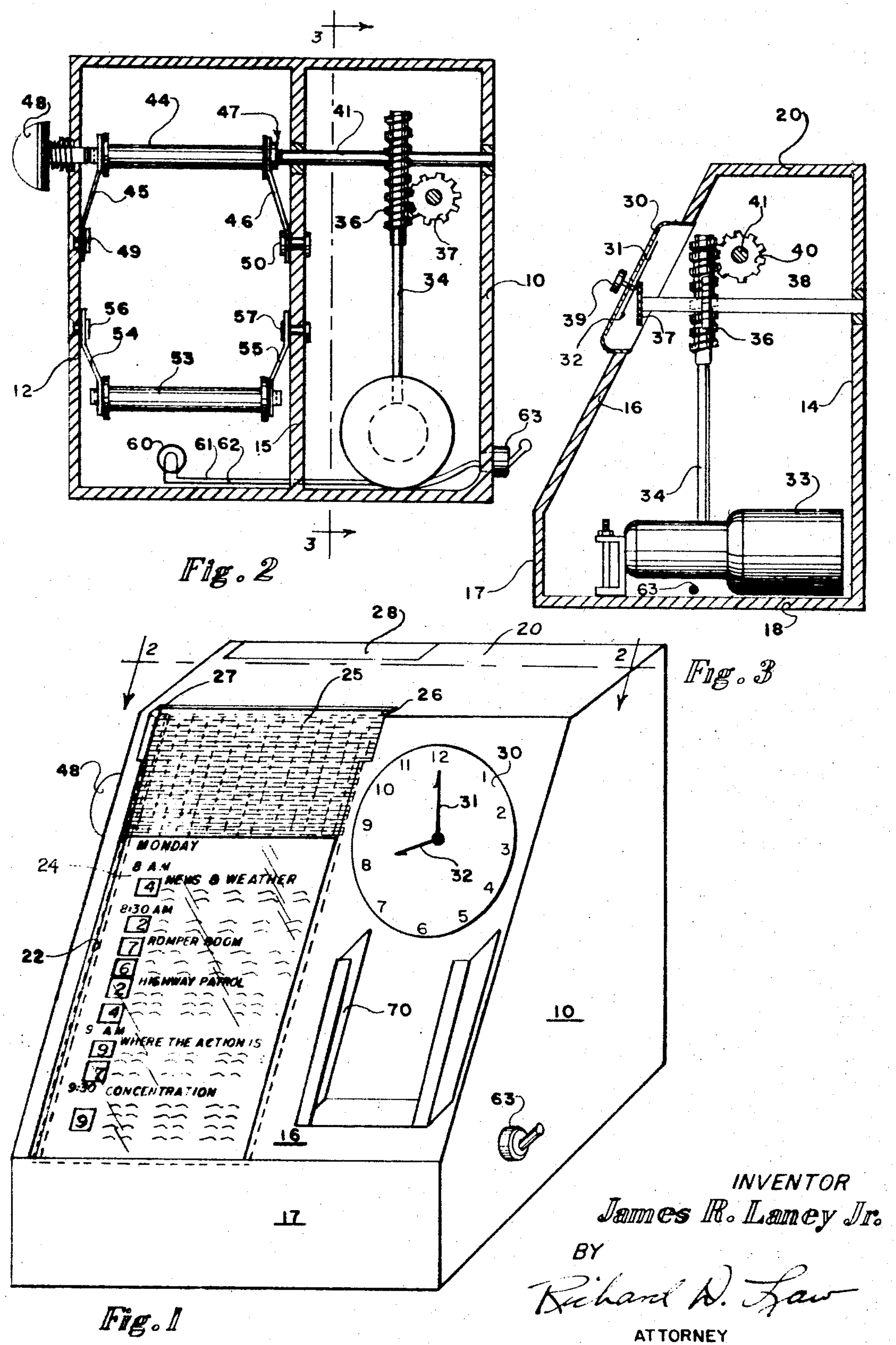
FIG. 1 is a perspective of a holder according to the invention.
FIG. 2 is a cross-sectional view of the holder, taken along section line 2—2 of FIG. 1.
FIG. 3 is a cross-sectional view of the holder, taken along section line 3—3 of FIG. 2.

In the embodiment selected for illustration, a box-like holder is arranged with a sloping front face for easy viewing by a user, and it includes opposed sides 10 and 12, and a back 14 depending from base member 18. A sloping front 16 intersects a short, lower, upright front wall 17 which is connected to a base member 18. A top 20 joined to the sides and the back and the front completes the structure. A cut-out portion 22 is provided in the sloping front section 16 for viewing a portion of a scroll which is wound on spools. The opening may be closed by a clear glass or plastic slide 24 having an opaque top 25 which is arranged for readily slipping out of a groove 26 on one side and 27 on the other side, for replacing a scroll. A slide cover 28 provides access to the back of the cabinet. A clock 30 having hands 31 and 32 is fixed in the remaining portion of the sloped front 16 so as to be readily visible to a user.

A gear head motor 33 (or equivalent) is mounted internally of the container and a shaft 34 extends upwardly from the gear head to a drive worm 36 which meshes with a worm wheel 37 mounted on a shaft 38 for driving the hands 31 and 32 around the clock 30. A hand set knob 39 provides means for turning the hands for setting the clock as desired. A second worm wheel 40 mounted on a shaft 41 is arranged to drive a spool 44 mounted on spring arms 45 and 46 in conventional manner. A pawl and ratchet arrangement 47 is mounted between the shaft 41 and the spool 44 so that a spool may be turned by handle 48 without rotating the shaft 41. Such one-way ratchets are conventional and further details are not necessary. The spring arms 45 and 46 are secured to cabinet walls by means of rivets or screws 49 and 50. A second spool 53 may be mounted on spring arms 54 and 55 and so held that it is free wheeling and, in accordance with conventional practices, such a spool provides a supply from which it may be wound onto the spool 44. The spring arms 54 and 55 are secured to the walls by means of screws or rivets 56 and 57.

An incandescent light 60 (shown schematically) connected by leads 61 and 62 to the leads of the motor may be conveniently placed near the front of the container for illuminating the scroll. A single throw switch 63 in the wall 10 provides means for turning on the device, including both the clock, the scroll winder and the lamp.

For use, a television log, in the form of a scroll which may contain a week or more of program, is wound on a spool, for example, spool 53. The cover 24 is removed from the container and the supply spool is mounted on the spring arms 54 and 55, as is conventional. The free end of the scroll is then attached to spool 44 which is replaced in the spring arms 45. The manual control knob 48 is turned to position the log or scroll to the current programs. The clock is set to the proper time and the switch 63 is thrown to actuate the motor 33. As time progresses, the gearing turning the shaft of the clock and the shaft of the scroll may be coordinated so that the program displayed in window 24 advances to maintain the current program in addition to several hours' programs in the window, corresponding to the time on the clock. The incandescent light provides illumination for the scroll and, where desired, the clock may also be lighted by means of an incandescent lamp behind the face which may be translucent or the like. For one form, when viewing of the television is ceased, the switch 63 is turned to off position, deactivating the motor. When next the television is to be viewed, the scroll is turned forwardly by means of the handle 48 to the current program, and the clock again set to the current time. Activating the switch again activates the motor for moving the scroll ahead with the clock.

Where it is desirable, the clock may be made separate so that it operates at all times, and a motor for the scroll may be selectively activated for maintaining the current program in relation to the clock time. In this manner a clock may be provided near the television set which is operating at all times, but the log need only operate when viewing is desired. For television sets having remote control boxes, a holder 70 mounted on the face 16 provides a very convenient receptacle for the remote control actuator.

The program log holder may be made in a variety of materials and finishes to match or contrast with the television or radio set, and/or the decor of the room in which the set is used. The holder may be placed on the top of the set or may be placed adjacent the favorite chair of the user for convenience in maintaining a current log which is readily viewable to the user. It is, of course, recognized that the log may be moved manually to provide a progressive log.

The device illustrated may be operated by household current from a power line (not shown) connectable to a conventional 110 volt A.C. receptacle by a conventional pronged fitting on the line. The unit may, also, be battery operated in a similar manner. The batteries may be inserted in conventional brackets or the like and wired to the motor or motors and lamp in conventional circuitry. The door or cover 28 provides access to the container for easy insertion of batteries into holders. Where a separate motor drives each of the clock and the scroll, a switch is provided for each circuit in the manner of switch 63.

While the invention has been illustrated with reference to a particular embodiment, there is no intent to limit the spirit or the scope of the invention to the precise details so set forth except as defined in the following claims.

I claim:

1. A holder for a radio and/or television program log arranged in an elongated scroll wound on a supply roller comprising a hollow, upright container; a transparent, removable cover over a portion of a side of said container exposing the interior thereof; a second roller for accepting said scroll mounted in said container adjacent said cover; means for supporting said scroll supply roller in said container adjacent said cover whereby a portion of the program is visible therethrough when the scroll is connected between said supply roller and second roller; a time clock mounted in said container adjacent said transparent cover and arranged for substantially simultaneous visual observation of said cover and said clock; means for continuously turning said second roller at a rate to change the visible program portion on said scroll in hour to hour coordination with movement of said clock; and motor means for driving said clock.

2. A holder according to claim 1 wherein said means for turning said second roller and said motor means are electrically operated.

3. A holder according to claim 2 wherein said motor means actuates said means turning said second roller through a common drive.

4. A holder according to claim 3 wherein said means turning said second roller is selectively releasable from said common drive.

5. A holder according to claim 2 wherein lamp means is arranged in said container for illuminating said scroll and is in the electric circuit for said means for turning said roller.

6. A holder according to claim 2 wherein a separate electric motor individually drives said second roller and said clock.

7. A holder according to claim 1 wherein one side of said container is sloped and said transparent cover is in said sloped side.

References Cited

UNITED STATES PATENTS

| | | | |
|---|---|---|---|
| 2,069,390 | 2/1937 | Prince | 40—117 |
| 2,011,670 | 8/1935 | Baird. | |
| 2,109,535 | 3/1938 | Jones. | |
| 3,289,336 | 12/1966 | Weiner | 40—117 |

EUGENE R. CAPOZIO, *Primary Examiner.*

WENCESLAO J. CONTRERAS, *Assistant Examiner.*

U.S. Cl. X.R.

40—28